US009563960B2

United States Patent
Fang et al.

(10) Patent No.: US 9,563,960 B2
(45) Date of Patent: Feb. 7, 2017

(54) METHOD FOR DETECTING FOREGROUND

(71) Applicant: MEDIATEK INC., Hsin-Chu (TW)

(72) Inventors: Hung-Chi Fang, Yilan County (TW); Fang-Chen Chang, Hsinchu (TW); Yu-Jen Chen, Hsinchu (TW)

(73) Assignee: MEDIATEK INC, Hsinchu (TW)

( * ) Notice: Subject to any disclaimer, the term of this patent is extended or adjusted under 35 U.S.C. 154(b) by 485 days.

(21) Appl. No.: 14/248,364

(22) Filed: Apr. 9, 2014

(65) Prior Publication Data
US 2015/0294179 A1    Oct. 15, 2015

(51) Int. Cl.
| | | |
|---|---|---|
| *G06K 9/46* | (2006.01) | |
| *G06T 7/00* | (2006.01) | |
| *G06T 3/40* | (2006.01) | |
| *G06T 7/20* | (2006.01) | |
| *H04N 7/01* | (2006.01) | |
| *H04N 19/553* | (2014.01) | |
| *H04N 19/513* | (2014.01) | |
| *H04N 19/587* | (2014.01) | |

(52) U.S. Cl.
CPC ........... *G06T 7/0081* (2013.01); *G06T 3/4007* (2013.01); *G06T 7/2006* (2013.01); *G06T 7/2013* (2013.01); *H04N 7/014* (2013.01); *H04N 19/513* (2014.11); *H04N 19/553* (2014.11); *H04N 19/587* (2014.11); *G06T 2207/10016* (2013.01); *G06T 2207/20144* (2013.01)

(58) Field of Classification Search
CPC ........ G06T 3/4007; G06T 7/20; G06T 7/2006; G06T 7/2013; G06T 2207/20144; H04N 5/144; H04N 5/145; H04N 7/01; H04N 7/014; H04N 19/503; H04N 19/51; H04N 19/513; H04N 19/521; H04N 19/553; H04N 19/563; H04N 19/573; H04N 19/577; H04N 19/583; H04N 19/587
USPC ........ 382/100, 103, 107, 154, 236; 348/699; 375/240.15, 240.16
See application file for complete search history.

(56) References Cited

U.S. PATENT DOCUMENTS

| | | | |
|---|---|---|---|
| 6,487,313 B1 | 11/2002 | De Haan et al. | |
| 7,058,227 B2 | 6/2006 | De Haan et al. | |
| 7,995,793 B2 | 8/2011 | Mertens | |
| 8,279,930 B2* | 10/2012 | Kawase | H04N 19/513 375/240.16 |
| 8,373,796 B2* | 2/2013 | Piek | G06T 7/2006 348/699 |

(Continued)

*Primary Examiner* — Eric Rush
(74) *Attorney, Agent, or Firm* — McClure, Qualey & Rodack, LLP (57) ABSTRACT

A method and apparatus for foreground detection by designating one of two non-occlusion areas as the foreground area according to results of position matching using two given motion vectors. The detection is performed by matching the position of the current occlusion area in the current frame with one or more positions of a previous occlusion area in a previous frame. The matching operation is based on motion vectors determined for the neighboring areas adjacent to the current occlusion area. The determination of the motion vectors are based on two neighboring frames temporally located before and after the current frame. If the position of the current occlusion area is matched with the previous occlusion area by using one of the motion vectors, the neighboring area corresponding to the motion vector is designated as a foreground area.

12 Claims, 9 Drawing Sheets

(56) References Cited

U.S. PATENT DOCUMENTS

| | | | |
|---|---|---|---|
| 8,447,126 B2* | 5/2013 | Chen | H04N 19/513 |
| | | | 382/236 |
| 8,774,276 B2* | 7/2014 | Lin | H04N 19/00 |
| | | | 375/240.16 |
| 2008/0095399 A1* | 4/2008 | Cui | G06T 7/2013 |
| | | | 382/103 |

* cited by examiner

METHOD FOR DETECTING FOREGROUND

FIELD OF THE INVENTION

The present invention relates to image processing. In particular, the present invention relates to detecting foreground areas in pictures of a video sequence.

BACKGROUND AND RELATED ART

Motion estimation is a widely used method for image processing, such as for the prediction or interpolation of moving objects in a predicted or interpolated image. To compute each part of the image, occlusion problem has to be resolved. Besides detecting the occlusion area(s) of the image, the location of the foreground or background area(s) also need be identified so that the reference used to predict the occlusion areas can be determined.

Occlusion areas are parts of scene which are visible in one frame and become invisible in a neighboring frame of multiple consecutive images due to blockage by foreground object(s). Each of the consecutive images can be a picture captured by imaging system or an interpolated image based on captured pictures. For consecutive images captured by a camera, the presence of the occlusion areas is caused by the changing of relative position between the objects and the camera. When parts of the image become invisible, at least a portion of a background object is covered by a foreground object located closer to the camera due to the projection. Vise verse, the foreground object is located more far away from the camera in the scene and parts of the background become uncovered. The parts of the background object which become covered or uncovered are referred as occlusion areas. When the areas become covered or uncovered, the uniquely matched areas in neighboring images cannot be found by motion estimation. Therefore, occlusion problem has to be taken special care, otherwise artifacts may occur in temporal interpolation.

Figure 1:
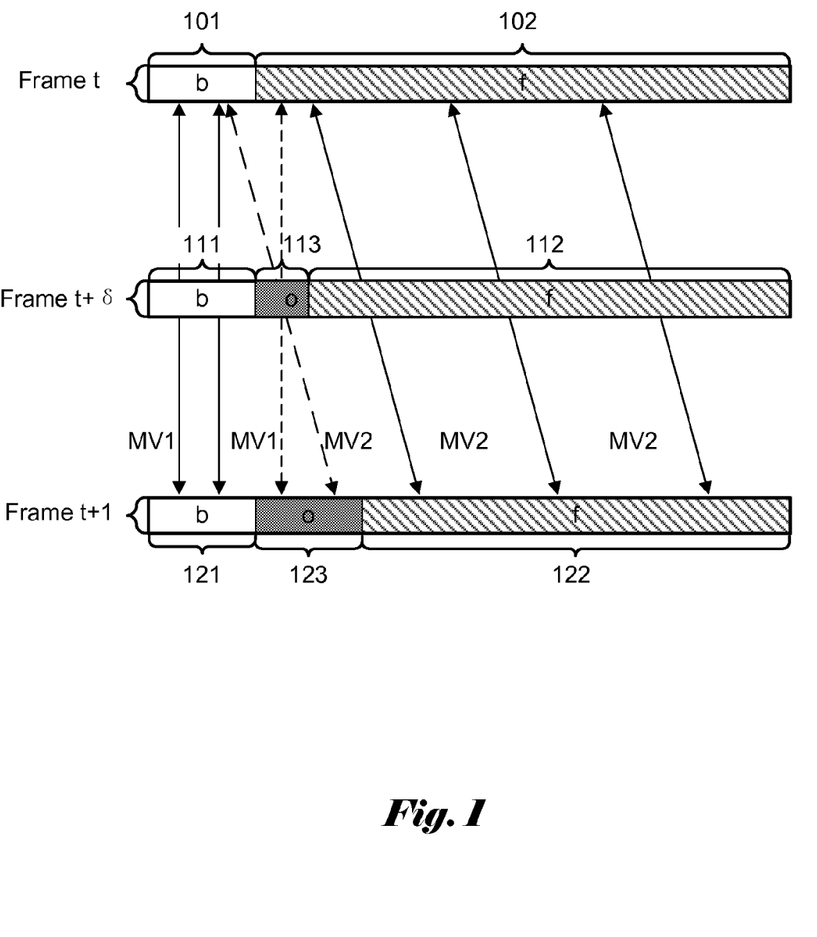
FIG. 1 illustrates an example of occlusion detection based on two motion vectors.

In a conventional method, occlusion detection is based on pixel differences associated with two motion vectors between two consecutive images (U.S. patent Ser. No. 7,995,793). One of the two motion vectors may be zero, which corresponds to a background that is stationary relative to the camera. FIG. 1 illustrates an example of occlusion detection based on two motion vectors between two consecutive frames, Frame (t) and Frame (t+1) captured by an imaging system. Frame (t+δ) is to be temporally interpolated based on Frame (t) and Frame (t+1). Two motion vectors (i.e., MV1 and MV2) are determined to describe the motion between the two frames, where MV1=0 corresponds to zero motion for the background areas.

Frame (t+δ) is formed by projecting Frame (t) to Frame (t+1) according to one of the two motion vectors. For example, area 111 in Frame (t+δ) is formed by projecting area 101 in Frame (t) to area 121 in Frame (t+1) according to motion vector MV1 since good match between area 101 and area 121 can be found using motion vector MV1. Similarly, area 112 in Frame (t+δ) is formed by projecting area 102 in Frame (t) to area 122 in Frame (t+1) according to motion vector MV2 since good match can be found between area 102 and 122 using motion vector MV2. Nevertheless, for area 113 in Frame (t+δ), none of the motion vectors can result in good match between corresponding areas in Frame (t) and Frame (t+1). In other words, the pixel differences are large for corresponding areas in Frame (t) and Frame (t+1) associated with area 113 in Frame (t+δ) regardless which of the two motion vectors is used.

Besides detecting the location of an occlusion area, the reference in the neighboring image should be determined for the prediction of the occlusion area. As the image content in the occlusion area is from the corresponding area to be covered or becoming uncovered, the location of the corresponding area should be identified. The corresponding area newly to be covered or becoming uncovered is adjacent to the background area in the neighboring image used to predict the background area adjacent to the occlusion area in the current frame. Therefore, the location of the corresponding area can be determined indirectly by determining the location of either the foreground area or the background area adjacent to the occlusion area.

Figure 2:
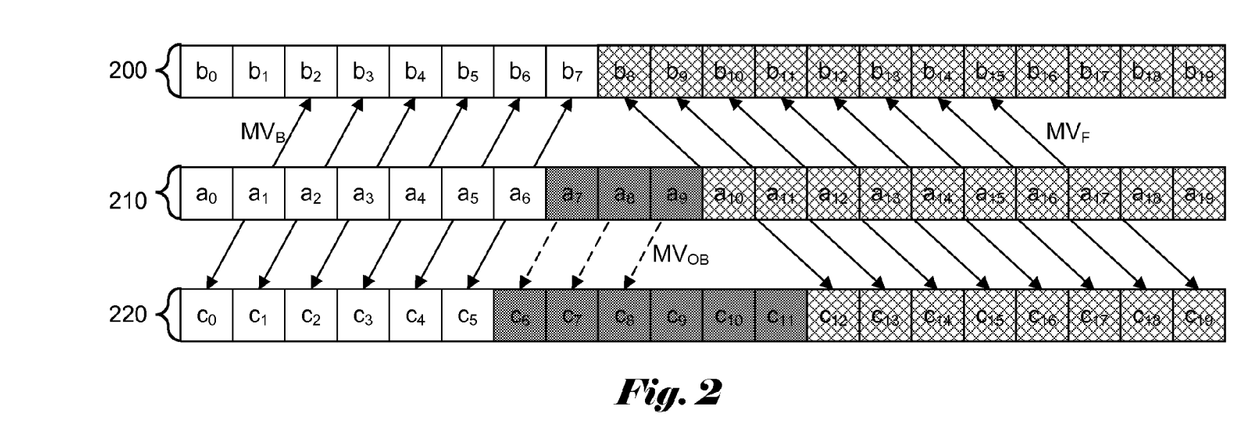
FIG. 2 illustrates an example of reference blocks used to predict one image in three consecutive frames.

FIG. 2 illustrates an example of reference blocks used to form each block of an interpolated frame. Frame 210 is interpolated based on neighboring frames 200 and 220. Frames 200 and 220 are two consecutive frames captured by an imaging system. In this example, left objects correspond to background areas and right objects correspond to the foreground areas in frame 200 and frame 220. As shown in FIG. 2, blocks $b_0$ to $b_7$ are located in the background area and blocks $b_8$ to $b_{19}$ are located in the foreground area of frame 200. Blocks $c_0$ to $c_5$ are located in the background area and blocks $c_{12}$ to $c_{19}$ are located in the foreground area of frame 220. Blocks $c_6$ to $c_{11}$ in frame 220 are located in an area to be covered or becoming uncovered by the foreground area. If the motion estimation is performed from frame 200 to frame 220, blocks $c_6$ to $c_{11}$ are located in newly uncovered area of frame 220. Otherwise, blocks $c_6$ to $c_{11}$ are becoming covered if the motion estimation is performed from frame 220 to frame 200. The matched blocks in frame 200 and frame 220 can be found for the interpolation of the blocks in frame 210. The relationship between matched blocks in frame 200 and frame 220 can be determined by using motion estimation techniques. For example, motion vector $MV_B$ may be derived for the background area and $MV_F$ may be derived for the foreground area as shown by the bidirectional arrows in FIG. 2. Block-based motion estimation may be used and the technique is well known in the art. Therefore the details are not described here. It is noted that the length of each arrow has no relation with the length of any motion vector. In this example, blocks $c_0$, $c_1$, $c_2$, $c_3$, $c_4$ and $c_5$ in frame 220 are matched with blocks $b_2$, $b_3$, $b_4$, $b_5$, $b_6$ and $b_7$ in frame 200, respectively. Similarly, blocks $c_{12}$, $c_{13}$, $c_{14}$, $c_{15}$, $c_{16}$, $c_{17}$, $c_{18}$ and $c_{19}$ are matched with blocks $b_8$, $b_9$, $b_{10}$, $b_{11}$, $b_{13}$, $b_{14}$, and $b_{15}$, respectively. For the area to be covered or becoming uncovered in frame 220, no block in frame 200 can be matched with blocks $c_6$, $c_7$, $c_8$, $c_9$, $c_{10}$ and $c_{11}$.

Frame 210 is interpolated based on frames 200 and 220. Each pair of matched blocks in frame 200 and frame 220 is used as two reference blocks to form one interpolated blocks of frame 210. Blocks in the foreground or the background of the interpolated frame can be formed based on the corresponding two reference blocks in these two neighboring frames. However, occlusion blocks $a_7$, $a_8$ and $a_9$ in frame 210 can only be predicted based on the corresponding area to be covered or becoming uncovered in frame 220 as no matched blocks can be found in frame 200. The occlusion blocks $a_7$, $a_8$ and $a_9$ should be predicted based on blocks $c_6$, $c_7$ and $c_8$, respectively. The relation between occlusion blocks $a_7$, $a_8$ and $a_9$ and the corresponding reference blocks $c_6$, $c_7$ and $c_8$ can be given by motion vector $MV_{OB}$ which is shown by the dashed arrows in FIG. 2. $MV_{OB}$ is same as the motion vector giving the relationship between background areas of frame 210 and frame 220, such as the motion vector representing the relationship from $a_6$ to $c_5$. As shown in FIG. 2, the reference area in frame 220 is adjacent to the background area used to predict the neighboring background area of the occlusion area in frame 310.

In FIG. 2, the size of the motion vector $MV_B$ or $MV_F$ is just indicative of the matched blocks in frame 200 and frame 220. The motion vector $MV_{OB}$ is indicative of the occlusion blocks and the corresponding reference blocks in frame 210 and frame 220. As is well known in the art of motion estimation, the block matching is performed in two-dimensional space and the motion vector usually consists of horizontal component and vertical component. Each of the blocks corresponds to a two-dimensional pixel array. The one-dimensional drawing in FIG. 2 is used to simplify the illustration. Furthermore, while the blocks $a_i$, $b_i$ and $c_i$ are drawn aligned vertically, it does not imply that the motion vector size is measured by the block size. For example, FIG. 2 may correspond to the match in the horizontal direction. The horizontal block may correspond to 8 pixels. While block $b_i$ is matched with block $c_{i+4}$ in the foreground area as shown in FIG. 2, it does not necessarily imply the horizontal motion vector is 32 pixels (i.e., 4×8 pixels).

Figure 3:
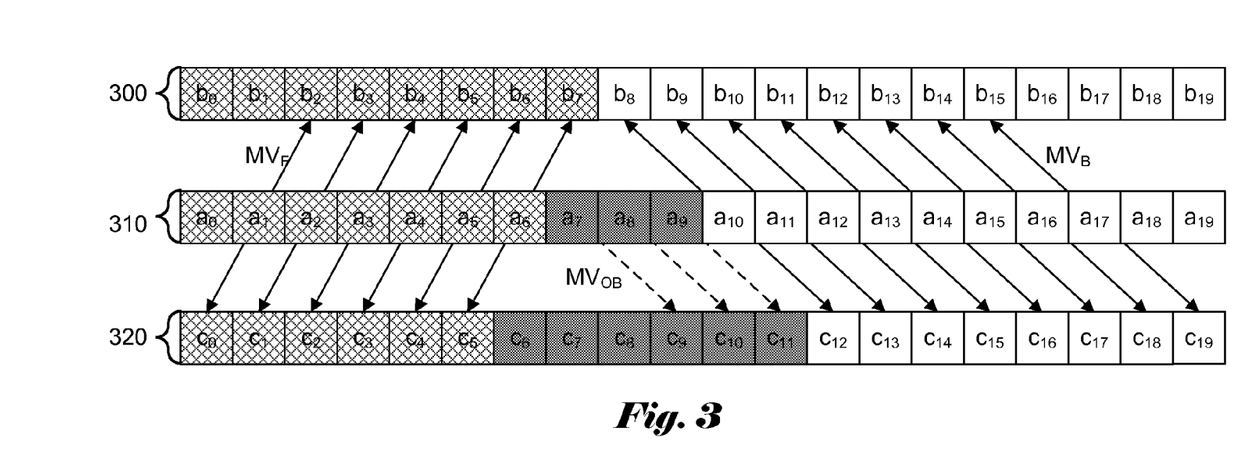
FIG. 3 illustrates another example of reference blocks used to predict one image in three consecutive frames.

FIG. 3 illustrates another example of reference blocks used to form each block of an interpolated frame. Different from the example shown by FIG. 2, right objects correspond to background areas and left objects correspond to the foreground area in frame 300 and frame 320. Therefore, blocks $b_0$ to $b_7$ are located in the foreground area and blocks $b_8$ to $b_{19}$ are located in the background area of frame 300. Blocks $c_0$ to $c_5$ are located in the foreground area and blocks $c_{12}$ to $c_{19}$ are located in the background area of frame 320.

Frame 310 is interpolated based on the two captured frames 300 and 320. Occlusion blocks $a_7$, $a_8$ and $a_9$ should be predicted based on blocks $c_9$, $c_{10}$ and $c_{11}$, respectively. The relationship between occlusion blocks $a_7$, $a_8$ and $a_9$ and blocks $c_9$, $c_{10}$ and $c_{11}$ can be given by motion vector $MV_{OB}$. In this example, $MV_{OB}$ is same as the motion vector giving the relationship between background areas of frame 310 and frame 320, such as the motion vector indicating the relationship from $a_{10}$ to $c_{12}$. The reference area used to predict the occlusion blocks in frame 310 corresponds to the area to be covered or becoming uncovered in frame 320. As shown in FIG. 3, the reference area in frame 320 is adjacent to the background area used to predict the neighboring background area of the occlusion area in frame 310. To calculate the occlusion blocks $a_7$, $a_8$ and $a_9$, the location of the reference blocks (blocks $c_9$, $c_{10}$ and $c_{11}$) should be determined.

If the location of the background area or the foreground area adjacent to the occlusion area is determined, the location of the area used as reference of the occlusion area can be determined indirectly. As shown in FIGS. 2 and 3, the area used as reference of the occlusion area is to be covered or becoming uncovered by the foreground area. The reference area of the occlusion area is adjacent to the reference area of the neighboring background area of the interpolated frame. The prediction can be performed by using the motion vector indicating the relationship from the neighboring background area in the current frame to the corresponding background area in the reference frame. Therefore, it is desirable to explore a method to determine the background area or the foreground area adjacent to the occlusion area for the prediction of the current image.

BRIEF SUMMARY OF THE INVENTION

A method and apparatus for detecting a foreground area in a current image are disclosed. According to one embodiment of the present invention, the foreground area is detected based on a first occlusion area in the current image, a second occlusion area, a first motion vector associated with a first neighboring areas and a second motion vector associated with a second neighboring areas. The first occlusion area comprises one or more first occlusion blocks and the second occlusion area comprises one or more second occlusion blocks. The first area consists of one or more first neighboring non-occlusion blocks in the current image. The second area consists of one or more second neighboring non-occlusion blocks in the current image. The first motion vector and the second motion vector are determined for the first area and the second area, respectively. The determination of the motion vectors is based on the first neighboring image temporally after the current image and the second neighboring image temporally before the current image.

The method of detecting the foreground area in the current image comprises receiving information of a first position of the first occlusion area, a second position of said second occlusion area, the first motion vector and the second motion vector. Then the foreground area is determined based on the received information. If the first position matches with the second position according to the first motion vector, the first area is designated as the foreground area adjacent to the first occlusion area. If the first position matches with the second position according to the second motion vector, the second area is designated as the foreground area adjacent to the first occlusion area.

The apparatus for detecting the foreground area in the current image comprises one or more electronic circuits. Said one or more electronic circuits are configured to receive information and designate the first area or the second area as the foreground area. The information comprises the first position, the second position, the first motion vector and the second motion vector. Said one or more electronic circuits are configured to designate the first area as the foreground area if the first position matches with the second position according to the first motion vector. If the first position matches with the second position according to the second motion vector, said one or more electric circuits are configured to designate the second area as the foreground area.

The first area and the second area of the current image may be temporally interpolated based on the first neighboring image and the second neighboring image. The first occlusion area can be selectively generated from the first neighboring image or the second neighboring image according to the foreground area detected and a selected motion vector that matched the first position with one of said one or more second positions.

The first neighboring image and the second neighboring image may be two consecutive images captured by an imaging system. The previous image may be temporally located before the second neighboring image. A first temporal picture distance between the current image and the previous image may be equal to a second temporal picture distance between the first neighboring image and the second neighboring image. The previous image may correspond to a previously interpolated image.

The first motion vector may be determined for a first neighboring non-occlusion block adjacent to the occlusion area. The second motion vector may be determined for a second neighboring non-occlusion block adjacent to the occlusion area. The first motion vector and the second motion vector can be determined based on forward motion estimation, backward motion estimation or bidirectional motion estimation between the first neighboring image and the second neighboring image. The first motion vector or the second motion vector can be determined according to a minimum block difference calculated between candidate reference blocks in the first neighboring image and the second neighboring image.

DETAILED DESCRIPTION OF THE INVENTION

In the present invention, a method is developed to detect foreground areas in an image. The detection is based on the result of occlusion area determination. The basic idea of the present invention is derived from image content changes in the neighboring areas adjacent to occlusion areas in a series of consecutive images. An occlusion area corresponds to a background area to be covered or becoming uncovered by a foreground area. Therefore, the image content of the background area changes at the part adjacent to each occlusion area. On the other hand, the foreground area adjacent to each occlusion area has two reference areas with matched image contents in the temporally previous and subsequent images. Thus, the foreground area adjacent to a current occlusion area can be detected by using the motion vectors determined for the neighboring areas adjacent to the occlusion area. Without knowing which neighboring area is the foreground area, the motion vectors for both neighboring areas adjacent to the occlusion area are used for processing the current occlusion area. The motion vectors are used to match the position of the current occlusion area with the positions of occlusion areas in another image. If one position of one occlusion area in another image is matched with the position of the current occlusion area in the current image and, the corresponding neighboring area is determined as the foreground area.

According to one embodiment of the present invention, the foreground area adjacent to the current occlusion area is detected based on the information of the occlusion area(s) in a previous image, and two motion vectors determined for two neighboring areas adjacent to the current occlusion area. The motion vectors can be determined by motion estimation technique to find matched areas in two neighboring images. According to one embodiment of the present invention, the motion vectors are calculated by bidirectional motion estimation. The method of motion estimation is a block-based method to find matched blocks in two neighboring images. The matched blocks can be determined based on the minimum sum of absolute value differences between candidate blocks in the two neighboring images.

Figure 4:
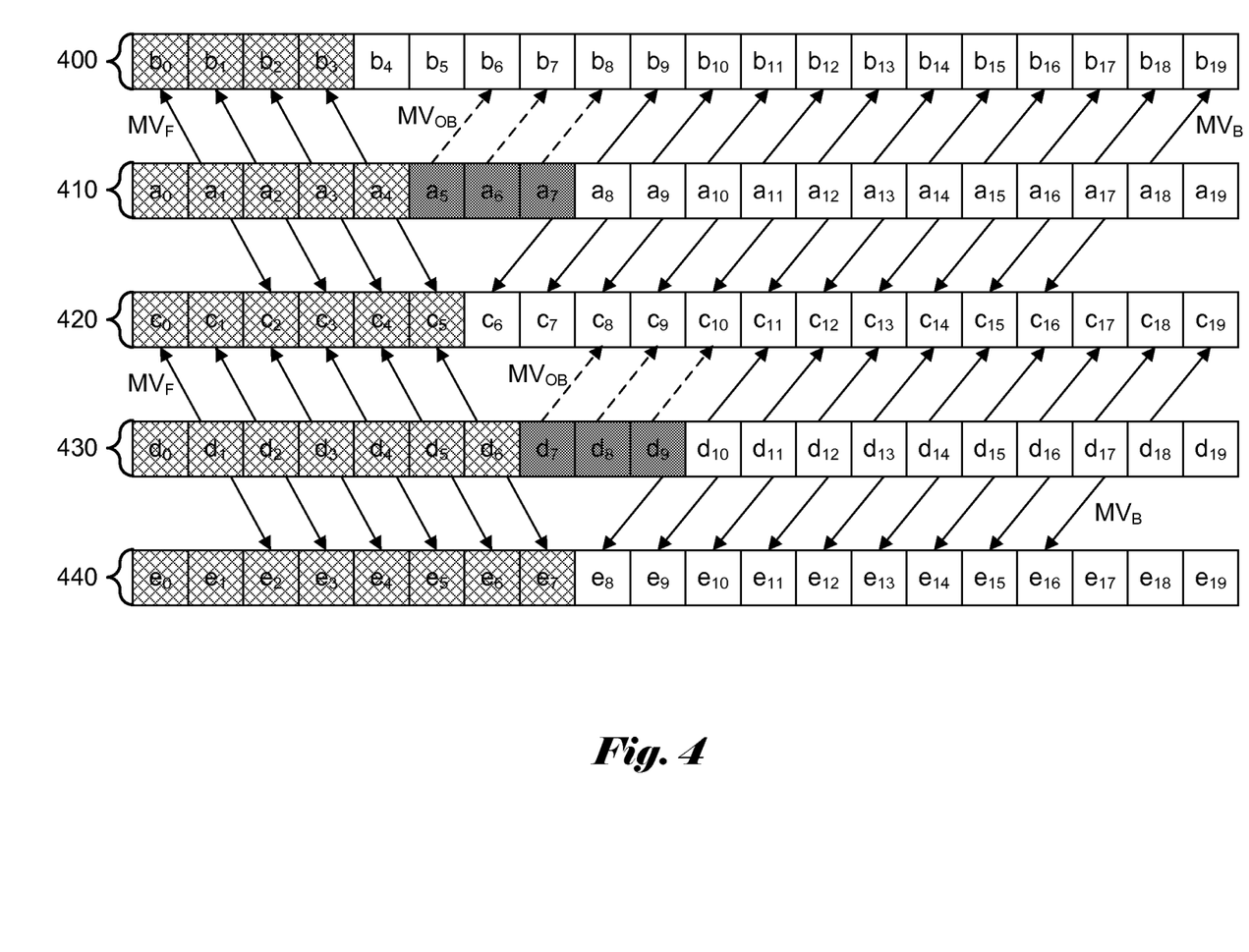
FIG. 4 illustrates an example of reference blocks used to predict occlusion blocks to be covered.

In order to explain the present invention, FIGS. 4 to 7 are used to illustrate the relationship of image contents in a series of consecutive images. FIG. 4 illustrates an example of reference blocks used to predict occlusion blocks of each interpolated frame among five consecutive frames. In this example, the left area in each frame is the foreground area and the right area is the background area with a portion becoming covered by the foreground area. Frame 410 is temporally located after frame 400 and the five frames are temporally located one after another. Frames 400, 420 and 440 are three existing frames which are captured by an imaging system such as a camera. Frame 410 is interpolated based on frame 400 and frame 420. Similarly, frame 430 is interpolated based on frame 420 and frame 440. In this example, the temporal picture distance between frame 400 and frame 420 is same as the temporal picture distance between frame 420 and frame 440. Meanwhile, the picture moving direction from frame 400 to frame 420 is same as from frame 420 to frame 440. Therefore, the motion vector indicating the background area moving in frame 400 and frame 420 is equal to the motion vector indicating the background area moving in frame 420 and frame 440.

Block-based motion estimation is used to find matched blocks in the existing frames. The motion vectors generated by motion estimation indicate the relationship between each matched block pair used as reference to form an interpolated block. As shown by the arrows in FIG. 4, motion vector $MV_F$ is derived for the foreground area and motion vector $MV_B$ is derived for the background area. In the foreground areas, block $b_i$ is matched with block $c_{i+2}$ and block $c_i$ is matched with block $e_{i+2}$. In the background areas, block $b_i$ is matched with block $c_{i-2}$ and block $c_i$ is matched with block $e_{i-2}$. In FIG. 4, the size of the motion vectors $MV_B$ and $MV_F$ is just indicative of matching blocks between frame 400 and frame 420 or between frame 420 and frame 440. The block matching is also performed in two-dimensional space and each of the motion vectors usually consists of horizontal component and vertical component. Each of the blocks corresponds to a two-dimensional pixel array. The one-dimensional drawing in FIG. 4 is used to simplify the illustration. Furthermore, while the blocks $b_i$, $c_i$, $d_i$ and $e_i$ are drawn aligned vertically, it does not imply that the motion vector size is measured by the block size. For example, FIG. 4 may correspond to the match in the horizontal direction. The horizontal block may correspond to 8 pixels. While block $b_i$ is matched with block $c_{i+2}$ in the foreground area as shown in FIG. 4, it does not necessarily imply the horizontal motion vector is 32 pixels (i.e., 4×8 pixels).

In the foreground area of frame 410, blocks $a_1$, $a_2$, $a_3$, and $a_4$ can be interpolated based on matched block pairs ($b_0$, $c_2$), ($b_1$, $c_3$), ($b_2$, $c_4$) and ($b_3$, $c_5$), respectively. In the background area of frame 410, blocks $a_8$ to $a_{18}$ can be interpolated based on matched block pairs ($b_9$, $c_7$) to ($b_{19}$, $c_{17}$), respectively. Similarly, blocks $d_1$, $d_2$, $d_3$, $d_4$, $d_5$ and $d_6$ in the foreground area of frame 430 can be interpolated according to matched block pairs ($c_0$, $e_2$), ($c_1$, $e_3$), ($c_2$, $e_4$), ($c_3$, $e_5$), ($c_4$, $e_6$) and ($c_5$, $e_7$). Blocks $d_{10}$ to $d_{17}$ in the background area of frame 430 can be interpolated according to corresponding matched block pairs ($c_{11}$, $e_9$) to ($c_{18}$, $e_{16}$).

As the blocks becoming covered in the previous reference frame has no matched block in the following reference frame, the occlusion blocks in frame 410 and 430 cannot be interpolated based on any pair of matched blocks. The precedent block of each occlusion block corresponds to a block to be covered by the foreground area. Therefore, the interpolation of the occlusion block can be performed based on the corresponding reference block to be covered. The corresponding reference blocks can be found by offsetting $MV_B$ on the direction from the interpolated frame to the previous reference frame. As shown by FIG. 4, the relationship between each occlusion block and the corresponding reference block can be given by $MV_{OB}$ which is shown by the dashed arrows. Occlusion blocks $a_5$, $a_6$ and $a_7$ in frame 410 are predicted based on the corresponding reference blocks $b_6$, $b_7$ and $b_8$ in frame 400. Similarly, occlusion blocks $d_7$, $d_8$ and $d_9$ in frame 430 are predicted based on the corresponding reference blocks $c_8$, $c_9$ and $c_{10}$ in frame 420.

Figure 5:
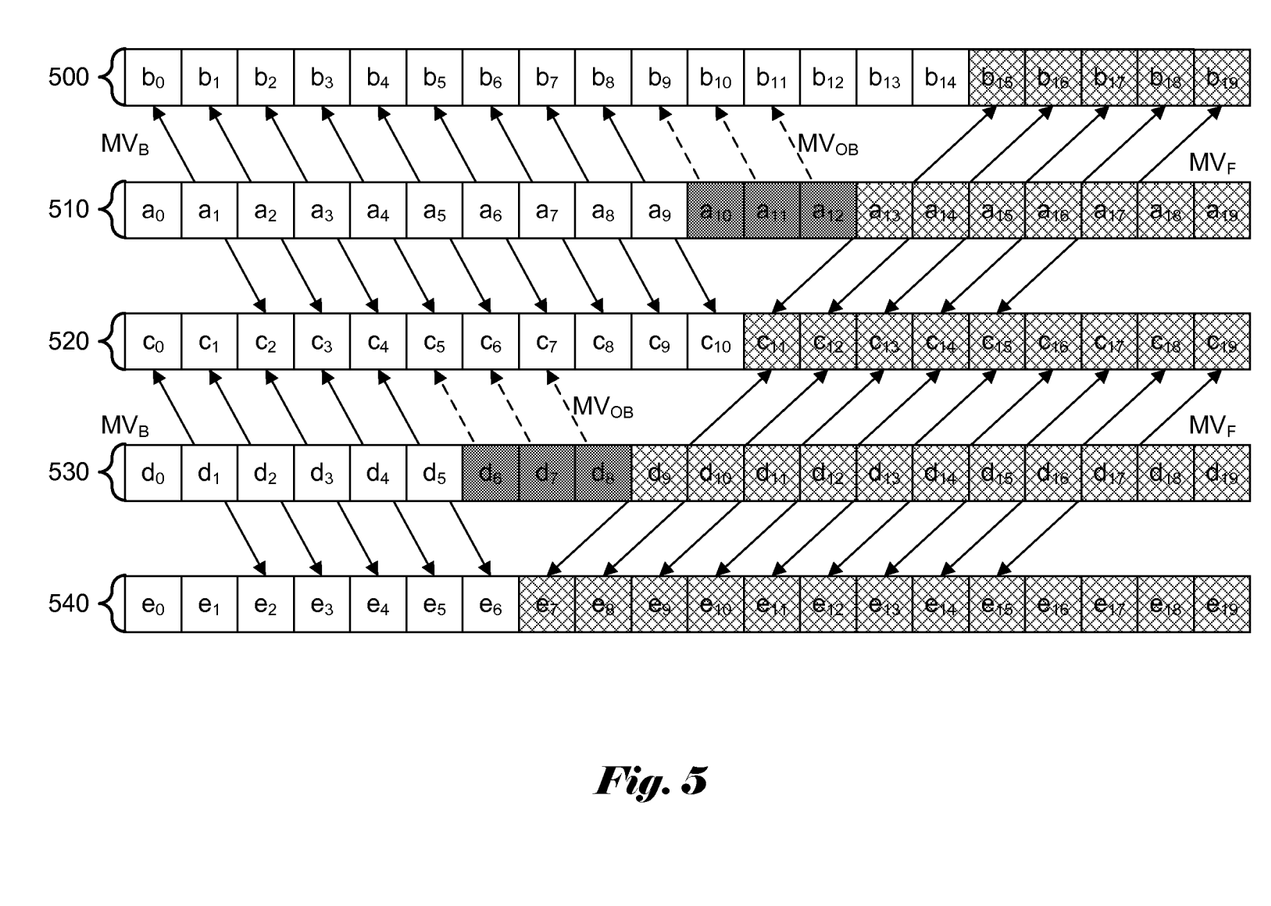
FIG. 5 illustrates another example of reference blocks used to predict occlusion blocks to be covered.

FIG. 5 illustrates another example of reference blocks used to predict occlusion blocks of each interpolated frame among five consecutive frames. The relative positions of the foreground area and the background area in each frame of this example is different from the example shown in FIG. 4. In this example shown by FIG. 5, the right area in each frame is the foreground area and the left area is the background area which is becoming covered by the foreground area. Frame 540 to frame 500 is temporally located one after another. Frames 510 and 530 are interpolated based on existing frames 500 and 520 and existing frames 520 and 540 respectively. By bidirectional motion estimation, the matched block pairs in the background areas of existing frames can be found to form the blocks in the background area of each interpolated frame. The motion vectors can be determined to giving the relationship between matched blocks in frames 500 and 520 or in frames 520 and 540. As shown by FIG. 5, $MV_B$ is determined for the background areas on the left side and $MV_F$ is for the foreground area on the right side. In frame 510, block $a_i$ is interpolated by block pair $(b_{i-1}, c_{i+i})$ in the background area and block $a_i$ is interpolated by block pair $(b_{i+2}, c_{i-2})$. Thus, matched block pairs $(b_0, c_2)$ to $(b_8, c_{10})$ are used to form corresponding interpolated blocks $a_1$ to $a_9$ in the background area of frame 510. Matched block pairs $(b_{15}, c_{13})$ to $(b_{19}, c_{15})$ are used to predict blocks $a_{13}$ to $a_{17}$ in the foreground area, respectively. In frame 530, block $d_i$ is interpolated by block pair $(c_{i-1}, e_{i+i})$ in the background area and block $d_i$ is interpolated by block pair $(c_{i+2}, e_{i-2})$ in the foreground area. The relationship between matched blocks is given by $MV_B$ in the background areas and by $MV_F$ in the foreground area.

Each occlusion block in the interpolated frame is also formed based on one reference block to be covered in the previous frame. The reference block can be found by offsetting motion vector ($MV_B$) determined for the foreground area on the direction from the occlusion block to the previous neighboring frame. In FIG. 5, the reference block of each occlusion block can be found by using $MV_{OB}$ which is illustrated by the dashed arrows. $MV_{OB}$ is obtained by offsetting $MV_B$ on the direction from one occlusion block to the previous frame used as reference. As shown in FIG. 5, occlusion block $a_i$ in frame 510 can be interpolated based on block $b_{i-1}$ which is going to be covered by the foreground area. In frame 530, occlusion block $d_i$ can be formed according to block $c_{i-i}$.

As illustrated in FIGS. 4 and 5, the reference block of each occlusion block can be found by using the motion vector determined for the background area. If the background area adjacent to the occlusion area is determined, the corresponding motion vector can be used for finding the reference blocks of the occlusion blocks. By offsetting motion vector $MV_F$ on the direction from the current occlusion block to the previous frame, the reference block can be found.

In examples of FIGS. 4 and 5, the occlusion area corresponds to a portion of the background area in the previous neighboring frame which is going to be covered. The image content changes in the portion of the background area adjacent to the occlusion area. The motion vector for the background area is determined based on the image content matched in the blocks of the neighboring images. Therefore, the motion vector determined for the background area cannot be used to indicate the relative position between the background area adjacent to the current occlusion area and the background area adjacent to any previous occlusion area in a previous frame. Thus, motion vector $MV_B$ cannot be used to match the position of the current occlusion area with the position of any occlusion area in the previous frame. For the example shown in FIG. 4, the background block ($a_4$) adjacent to the occlusion area in frame 410 is not matched with the background block ($d_6$) adjacent to the occlusion area in frame 430. Therefore, $MV_B$ cannot be used to match the position of occlusion area consisting of blocks $d_7$ to $d_9$ with the position of occlusion area consisting of blocks $a_5$ to $a_7$. In the example illustrated in FIG. 5, the background block ($a_9$) adjacent to the occlusion area in frame 510 is not matched with the background block ($d_5$) adjacent to the occlusion area in frame 530. Therefore, $MV_B$ cannot be used to match the position of the occlusion area in frame 510 with the position of the occlusion area in frame 530.

On the other side of the occlusion area, the foreground block adjacent to the occlusion area is based on the same image content. Then, the relative displacement of the occlusion area is same as the relative displacement of the foreground area adjacent to the occlusion area. Therefore, the motion vector determined for the foreground area adjacent to the current occlusion area can be used to indicate the relative position between the current occlusion area and a previous occlusion area in a previous frame. For the example in FIG. 4, the image content of block $b_3$ can be matched with the image content of block $a_4$, block $c_5$, block $d_6$ and block $e_7$. Motion vector $MV_F$ can be used to indicate the relationship between block $a_4$ and block $d_6$. Therefore, motion vector $MV_F$ can be used to match the position of the current occlusion area in frame 430 with the position of the previous occlusion area in frame 410. For the example in FIG. 5, the image content of block $b_{15}$ is matched with the image content of block $a_{13}$, block $c_{11}$, block $d_9$ and block $e_7$. Motion vector $MV_F$ can be used to indicate the relative position of block $a_{13}$ and block $d_9$. Therefore, motion vector $MV_F$ can be used to match the position of the current occlusion area in frame 530 and the position of the previous occlusion area in frame 510.

Figure 6:
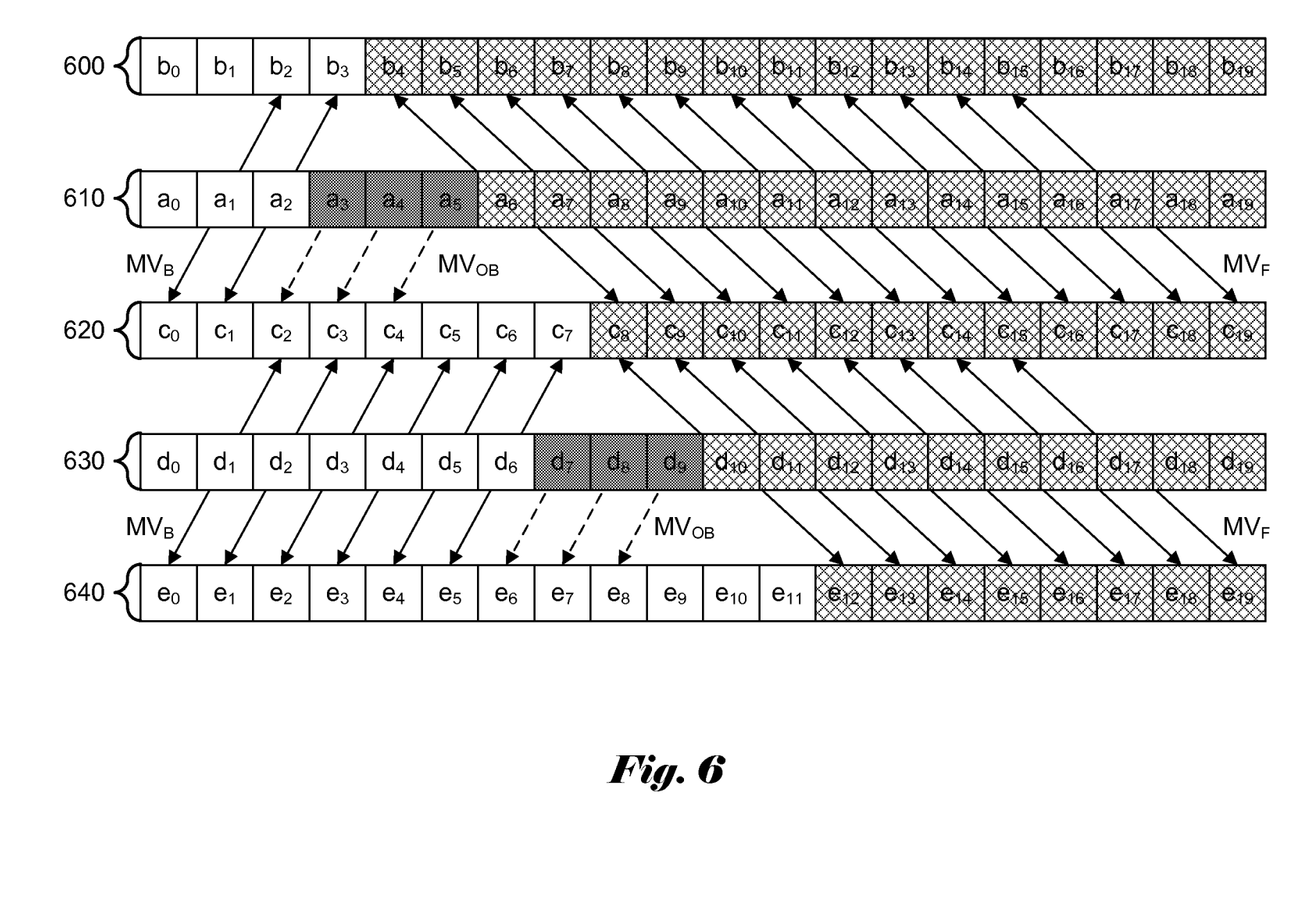
FIG. 6 illustrates an example of reference blocks used to predict occlusion blocks becoming uncovered.

FIG. 6 illustrates an example of reference blocks used to form occlusion blocks of each interpolated frame among five consecutive frames. In each frame, the right area is the foreground area and the left area is the background area. Different from the example shown in FIG. 5, a portion of the background area in each frame becomes uncovered by the foreground area in the following frame. The interpolated frame 610 is formed based on frames 600 and 620, and frame 630 is interpolated by using frames 620 and 640. The temporal picture difference between frame 610 and frame 630 is same as the temporal picture difference between frame 600 and frame 620, and the temporal picture difference between frame 620 and frame 640. Each block in the background area of the interpolated frame can be formed based on the corresponding matched block pair in the reference frames. Each block in the foreground area of the interpolated frame is computed by using one matched block pair in two neighboring frames. The matched blocks can be found by motion estimation with the motion vector indicating the relationship between two matched blocks. $MV_B$ is the motion vector for the background areas and $MV_F$ is the motion vector for the foreground areas, as illustrated by the bidirectional arrows in FIG. 6.

Since the occlusion blocks in each interpolated frame have no precedent in the previous frame, the interpolation of the occlusion blocks can only be based on the newly uncovered blocks in the following frame. $MV_{OB}$ represents the motion vector from the occlusion area to the corresponding newly uncovered area, as shown by the dashed arrows in FIG. 6. $MV_{OB}$ is same as the motion vector indicating the relationship between the background area of each interpolated frame and the background area of the following frame. Therefore, the reference block of each occlusion block can be found by offsetting $MV_B$ on the direction from the interpolated frame to the following frame. For the example shown in FIG. 6, the reference blocks of occlusion blocks $a_3$, $a_4$ and $a_5$ correspond to blocks $c_2$, $c_3$ and $c_4$ determined by using motion vector $MV_{OB}$. The reference block of occlusion blocks $d_7$, $d_8$ and $d_9$ correspond to blocks $e_6$, $e_7$ and $e_8$ determined by using motion vector $MV_{OB}$.

Figure 7:
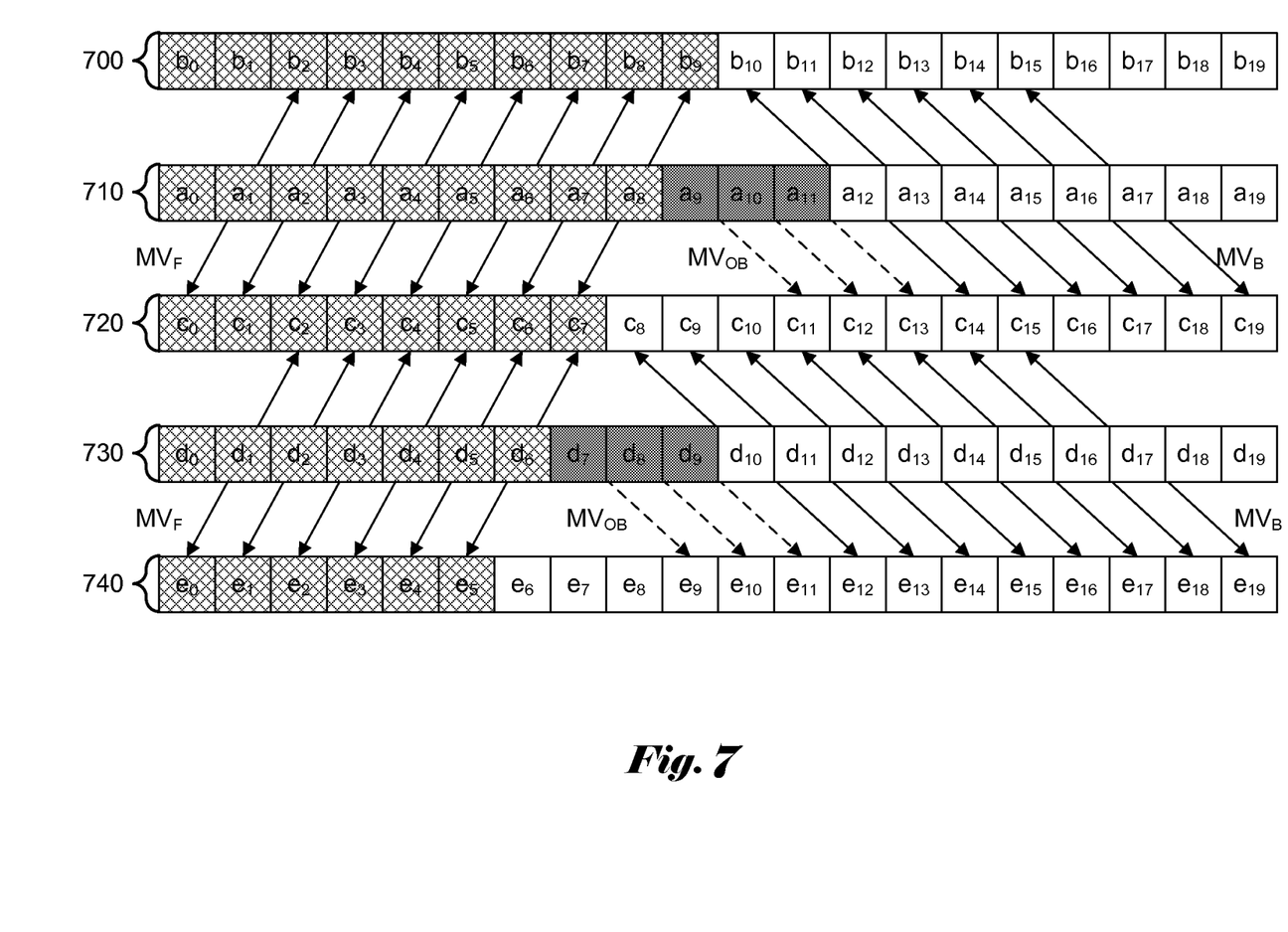
FIG. 7 illustrates another example of reference blocks used to predict occlusion blocks becoming uncovered.

FIG. 7 illustrates another example of reference blocks used to predict occlusion blocks of each interpolated frame among five consecutive frames. In this example, a portion of the background area in each frame also becomes uncovered by the foreground area in the following frame. The difference from the example shown in FIG. 6 is that the left area is the foreground area and the right area is the background area of each frame in the example shown in FIG. 7. In this example, the reference block of each occlusion block can be found by using $MV_{OB}$ indicating the relationship between of the occlusion area and the corresponding newly uncovered area. $MV_{OB}$ can be obtained based on the motion vector determined for the background area adjacent to the occlusion area. Therefore, the reference block of each occlusion block can also be found by offsetting $MV_B$ on the direction from the occlusion block to the following frame.

As illustrated by the examples in FIGS. 6 and 7, the reference block of each occlusion block can be found by using the motion vector determined for the background area. If the background area adjacent to the occlusion area is determined, the corresponding motion vector can be used for finding the reference blocks of the occlusion blocks. By offsetting motion vector $MV_F$ on the direction from the current occlusion block to the following frame, the reference block can be found.

In the examples shown in FIGS. 6 and 7, the reference block used to form the corresponding occlusion block of each interpolated frame is a portion of the background area being uncovered in the following frame. The image content of the background block adjacent to the occlusion area in the current frame is not matched with the image content of the background block adjacent to the occlusion area in each of following frames. On the other side of the occlusion area of each frame, the foreground block adjacent to the occlusion area is based on the same image content. Therefore, the relative displacement of the position of the occlusion area is same as the relative displacement of the foreground area adjacent to the occlusion area. Thus, the position of the current occlusion area can be matched with the position of one previous occlusion area in the previous frame by using motion vector $MV_F$.

To determine the reference block used for compute the occlusion block of the interpolated frame, the location of the background area or the foreground area should be determined so that to determine which motion vector can be used for finding the reference block. As illustrated by FIGS. 4 to 7, the relative displacement of the position of the occlusion area in the occlusion area is same as the relative displacement of the foreground area adjacent to the occlusion area. By using motion vector $MV_F$ determined for the foreground area, the position of the occlusion area can be found by offsetting $MV_F$ on the direction from the previous occlusion area to the current frame. Therefore, one neighboring area can be identified as the foreground area if the current occlusion area in the current frame is matched with the occlusion area in the previous frame by using the motion vector determined for the neighboring area. Another neighboring area adjacent to the occlusion area is the background area. Then the corresponding area used as reference of the current occlusion area can be determined.

Figure 8:
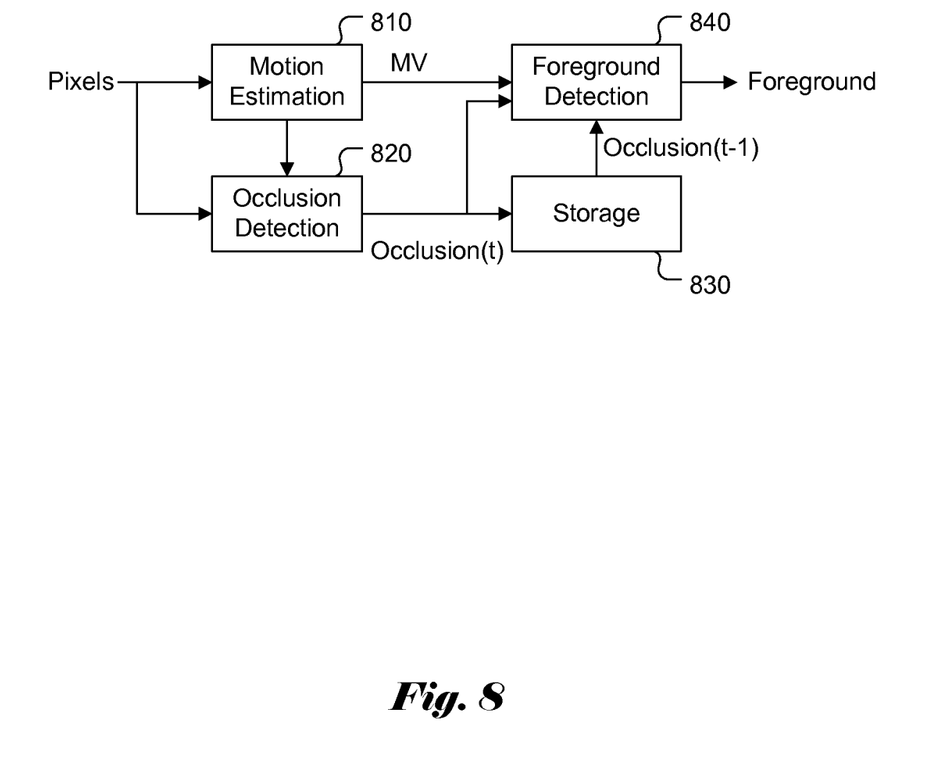
FIG. 8 illustrates an exemplary diagram for detecting foreground areas in the current image according to one embodiment of the invention.

Based on the current occlusion area in the current image and at least one previous occlusion area in one neighboring image, the foreground detection can be performed by using the motion vectors determined for the neighboring areas. In FIG. 8, an exemplary diagram is illustrated for detecting a foreground area in the current image according to one embodiment of the invention. Motion estimation 810 is performed for a current occlusion area (or block) based on the pixels associated with the two neighboring images. The result of the motion estimation can determine the motion vectors and other information used for occlusion detection. The motion vectors for the background area and the foreground area adjacent to the current occlusion area are determined based on the two neighboring images. All the information used for occlusion detection is delivered to occlusion detection 820. The method used for occlusion detection may also receive data of the input pixels for occlusion detection. Storage unit 830 receives and stores the information of the occlusion areas for foreground detection. Occlusion (t) denotes the information of the current occlusion area in current frame (t) which includes at least the position of the current occlusion area. Similarly, occlusion (t−1) represents the information of one or more the previous occlusion areas in previous frame (t−1) which includes at least position information of one or more the previous occlusion areas in previous frame (t−1).

In foreground detection 840, the motion vectors for the neighboring areas are applied to the position of the current occlusion area and one or more positions of one or more previous occlusion areas in the previous frame. If the current occlusion area is matched with one position of one occlusion area in the previous frame by using one motion vector, the neighboring area associated with the motion vector is designated as the foreground area. Then the area adjacent another side of the current occlusion area is the background area. The detection can be performed by block-based method. In block-based method, the motion vectors for the neighboring area of the current occlusion are applied on one current occlusion block in the current occlusion frame and one or more previous occlusion blocks in the previous frame. If the position of the current block is matched with one previous occlusion block in the previous frame, the foreground area is the neighboring area adjacent to the current occlusion area with the motion vector used for matching.

Instead of the occlusion area(s) in the previous image, the occlusion area(s) in the following image temporally located after the current image can also be used to detect the foreground area adjacent to the current occlusion area. As long as the position of the current occlusion area can be matched with the position of one occlusion area in the following frame, the neighboring area corresponding to the motion vector used for matching is the foreground area adjacent to the current occlusion area.

Figure 9:
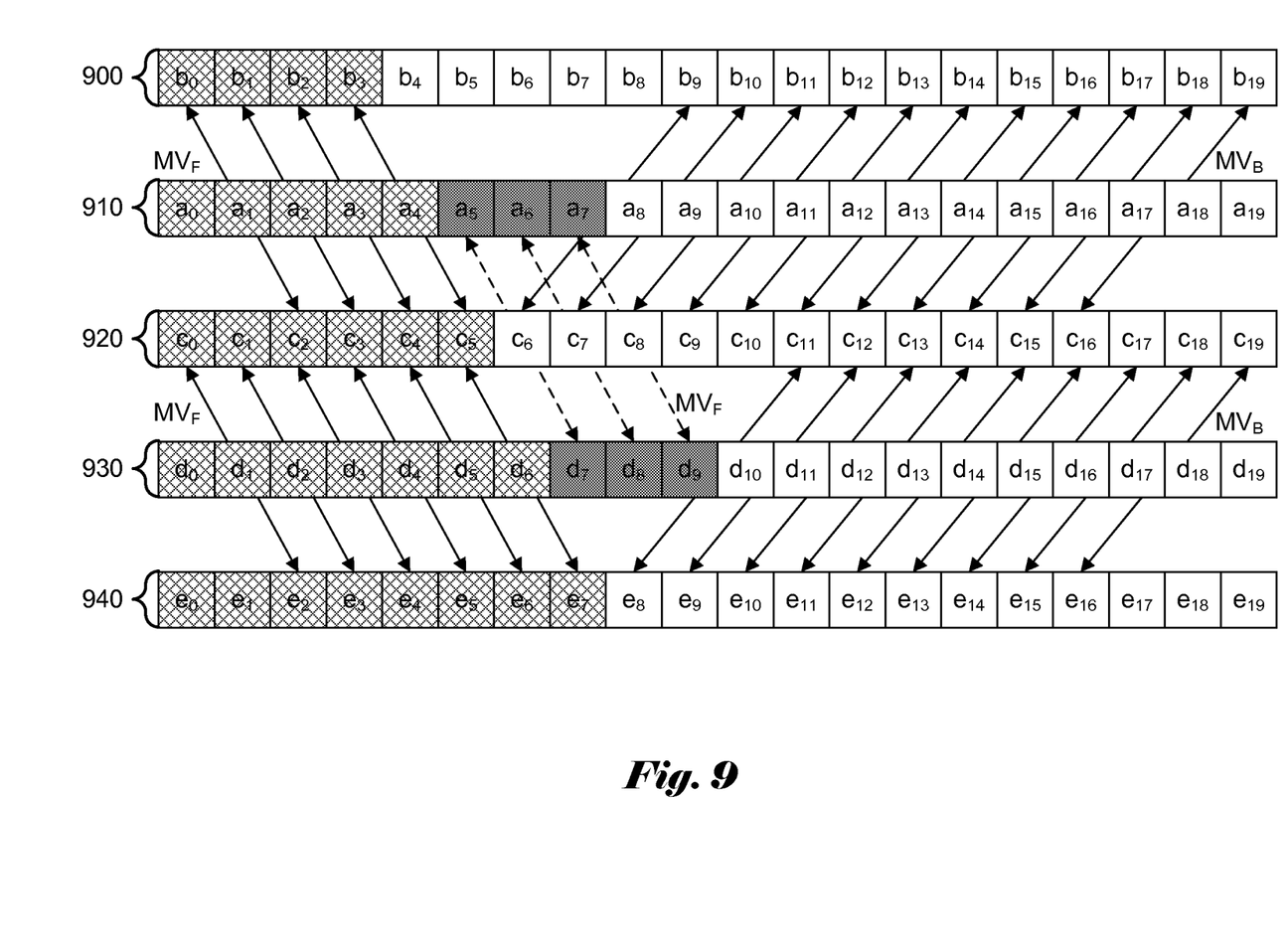
FIG. 9 illustrates an example for detecting foreground areas in the current image according to one embodiment of the present invention.

FIG. 9 illustrates an example for detecting a foreground area in the current frame according to one embodiment of the present invention. Frames 900, 920 and 940 are three existing frames used for the interpolation of frames 910 and 930. The temporal order of the five consecutive frames is from frame 900 to frame 940. The temporal picture difference between interpolated frame 910 and frame 930 is equal to the temporal picture difference between frame 900 and frame 920, and the temporal picture difference between frame 920 and frame 940. The foreground area on the left side and the background area on the right side move toward each other in frame 900 or frame 920. Then one option of the background area is covered by the foreground area in frame 920 or frame 940. By bidirectional motion estimation, the matched blocks are found and the relationship between each pair of matched blocks is given by motion vector $MV_F$ for the foreground area or $MV_B$ for the background area.

As shown in FIG. 9, the occlusion area in each interpolated frame is adjacent to the foreground area interpolated based on the reference blocks with matched image content. Therefore, the motion vector determined for the foreground area adjacent to the occlusion area can be used to match the position of the current occlusion area with the occlusion area in the previous or the following frame. Supposing frame 930 is the current frame, the position of the current occlusion area in frame 930 can be matched with the position of the occlusion area in previous frame 910. If a block-based method is used, the position of current block $d_7$ can be matched with the position of block $a_5$ in previous frame 910 by using $MV_F$. Vice versa, the position of current block $a_7$ can be matched with the position of block $d_9$ in following frame 930 by using $MV_F$ if the current frame is frame 910. Similarly, the position of block $a_6$ can be matched with the position of block $d_8$ by $MV_F$. The position of the occlusion area consisting of blocks $a_5$ to $a_7$ can be matched with the occlusion area consisting of blocks $d_7$ to $d_9$. Meanwhile, the position of block $a_5$, $a_6$ or $a_7$ cannot be matched with any position of blocks $d_7$, $d_8$ and $d_9$ by using motion vector $MV_B$. This is caused by the characteristic of the relative movement of foreground area and background area. The detail is not described here. Thus, the foreground area can be uniquely determined if the position of the current occlusion block can be matched with the position of one occlusion block in the previous frame by using motion vector $MV_F$.

Figure 10:
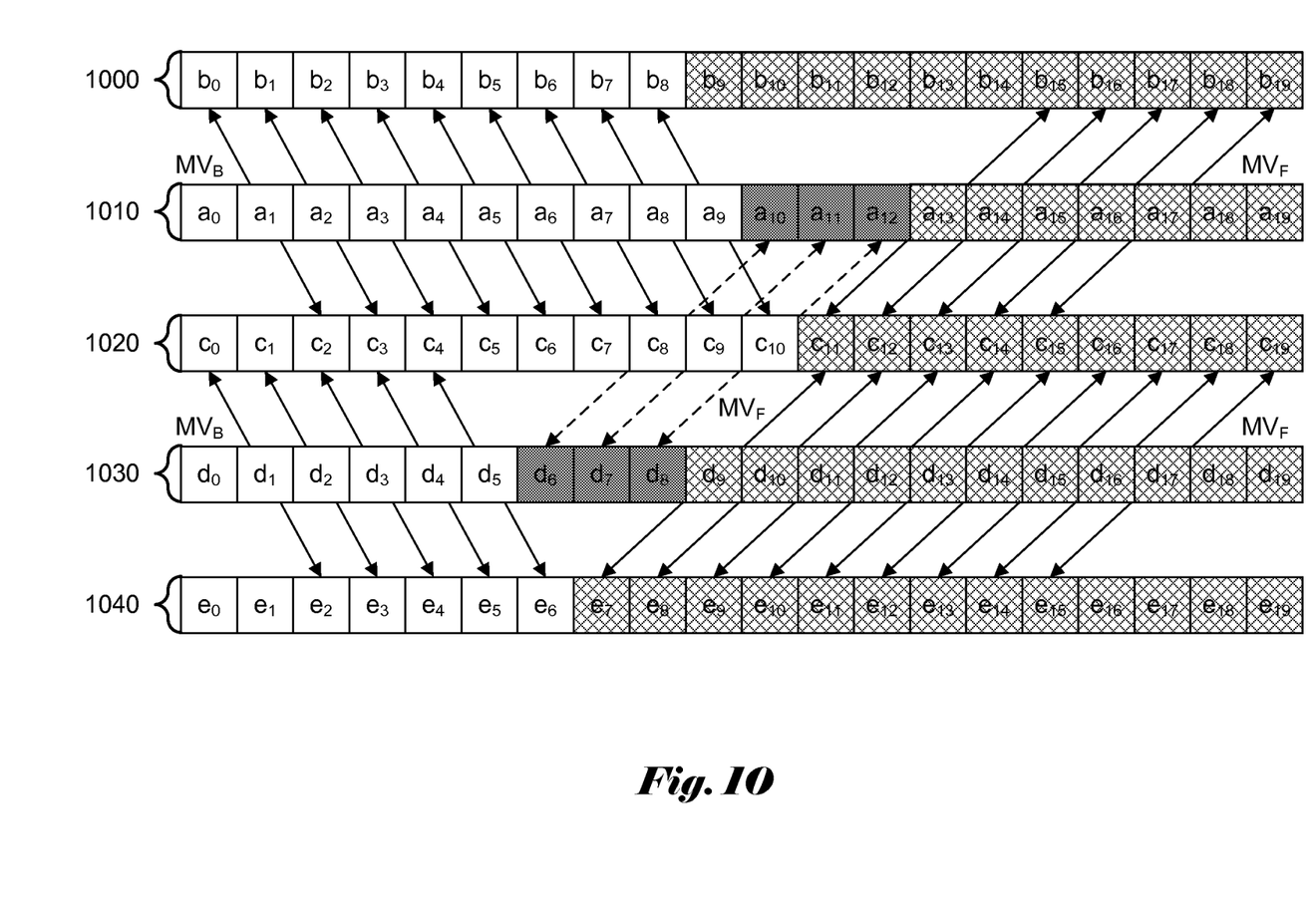
FIG. 10 illustrates another example for detecting foreground areas in the current image according to one embodiment of the present invention.

FIG. 10 illustrates another example for detecting a foreground area in the current frame according to one embodiment of the present invention. In this example, the background area is on the left side which is different from the example shown in FIG. 9. Frames 1000, 1020 and 1040 are three existing frames used for the interpolation of frames 1010 and 1030. The temporal order of the five consecutive frames is from frame 1000 to frame 1040.

As shown in FIG. 10, the occlusion area in each interpolated frame is also adjacent to the foreground area interpolated based on the reference blocks with matched image content. Therefore, the motion vector determined for the foreground area adjacent to the occlusion area can be used to match the position of the current occlusion area with one occlusion area in the previous or the following frame. Supposing frame 1030 is the current frame, the position of the current occlusion area in frame 1030 can be matched with the position of the occlusion area in previous frame 1010. When a block-based method is used, the position of current block $d_6$ can be matched with the position of block $a_{10}$ in previous frame 1010 by using $MV_F$. Similarly, the position of block $a_{11}$ can be matched with the position of block $d_7$ by $MV_F$. The position of the occlusion area consisting of blocks $a_{10}$ to $a_{12}$ can be matched with the occlusion area consisting of blocks $d_6$ to $d_8$. Meanwhile, the position of block $a_{10}$, $a_{11}$ or $a_{12}$ cannot be matched with any position of blocks $d_6$, $d_7$ and $d_8$ by using motion vector $MV_B$. Therefore, the foreground area can be uniquely determined if the motion vector for the area can be used to match the position of the current occlusion block (or area) with the position of one occlusion block (or area) in the previous frame.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of detecting a foreground area in a current image, the method comprising:
   receiving a first position of a first occlusion area in the current image, wherein the first occlusion area comprises one or more first occlusion blocks;

receiving a second position of a second occlusion area in a previous image, wherein the second occlusion area comprises one or more second occlusion blocks;

receiving a first motion vector associated with a first area consisting of one or more first neighboring non-occlusion blocks in the current image;

receiving a second motion vector associated with a second area consisting of one or more second neighboring non-occlusion blocks in the current image, wherein the first motion vector and the second motion vector are determined for the first area and the second area respectively based on a first neighboring image temporally after the current image and a second neighboring image temporally before the current image;

designating the first area as the foreground area if the first position matches with the second position according to the first motion vector; and designating the second area as the foreground area if the first position matches with the second position according to the second motion vector.

2. The method of claim 1, wherein the first area and the second area of the current image are temporally interpolated based on the first neighboring image and the second neighboring image.

3. The method of claim 1, wherein the first occlusion area is selectively generated from the first neighboring image or the second neighboring image according to the foreground area detected and a selected motion vector that matched the first position with the second positions.

4. The method of claim 1, wherein the first neighboring image and the second neighboring image are two consecutive images captured by an imaging system.

5. The method of claim 1, wherein the previous image corresponds to a previously interpolated image.

6. The method of claim 1, wherein the previous image is temporally located before the second neighboring image.

7. The method of claim 6, wherein a first temporal picture distance between the current image and the previous image is equal to a second temporal picture distance between the first neighboring image and the second neighboring image.

8. The method of claim 1, wherein the first motion vector is determined for a first neighboring non-occlusion block based on forward motion estimation, backward motion estimation or bidirectional motion estimation between the first neighboring image and the second neighboring image.

9. The method of claim 8, wherein the first motion vector is determined according to a minimum block difference calculated between candidate reference blocks in the first neighboring image and the second neighboring image.

10. The method of claim 1, wherein the second motion vector is determined for a second neighboring non-occlusion block of the current image based on forward motion estimation, backward motion estimation or bidirectional motion estimation between the first neighboring image and the second neighboring image.

11. The method of claim 10, wherein the second motion vector is determined according to a minimum block difference calculated between candidate reference blocks in the first neighboring image and the second neighboring image.

12. An apparatus for detecting a foreground area in a current image, the apparatus comprising one or more electronic circuits, wherein said one or more electronic circuits are configured to:

receive a first position of a first occlusion area in the current image, wherein the first occlusion area comprises one or more first occlusion blocks;

receive a second position of a second occlusion area in a previous image, wherein the second occlusion area comprises one or more second occlusion blocks;

receive a first motion vector associated with a first area consisting of one or more first neighboring non-occlusion blocks in the current image;

receive a second motion vector associated with a second area consisting of one or more second neighboring non-occlusion blocks in the current image, wherein the first motion vector and the second motion vector are determined for the first area and the second area respectively based on a first neighboring image temporally after the current image and a second neighboring image temporally before the current image;

designate the first area as the foreground area if the first position matches with the second position according to the first motion vector; and designate the second area as the foreground area if the first position matches with the second position according to the second motion vector.

* * * * *